United States Patent
Nelges

(10) Patent No.: US 9,524,808 B2
(45) Date of Patent: Dec. 20, 2016

(54) INSULATION MATERIAL HAVING PAINT AND A MATERIAL ADDITIVE, AND INSULATING TAPE

(75) Inventor: Jörg Nelges, Mosbach (DE)

(73) Assignee: ABB AG, Mannheim (DE)

( * ) Notice: Subject to any disclaimer, the term of this patent is extended or adjusted under 35 U.S.C. 154(b) by 1050 days.

(21) Appl. No.: 12/747,212

(22) PCT Filed: Dec. 10, 2008

(86) PCT No.: PCT/EP2008/010461
§ 371 (c)(1),
(2), (4) Date: Jun. 10, 2010

(87) PCT Pub. No.: WO2009/077111
PCT Pub. Date: Jun. 25, 2009

(65) Prior Publication Data
US 2010/0261021 A1    Oct. 14, 2010

(30) Foreign Application Priority Data

Dec. 18, 2007  (DE) ................ 10 2007 061 587

(51) Int. Cl.
| | |
|---|---|
| C08L 23/06 | (2006.01) |
| C08K 3/36 | (2006.01) |
| B32B 27/32 | (2006.01) |
| H01B 3/44 | (2006.01) |
| B32B 21/02 | (2006.01) |

(Continued)

(52) U.S. Cl.
CPC ............ *H01B 3/441* (2013.01); *B32B 21/02* (2013.01); *B32B 21/08* (2013.01); *B32B 27/36* (2013.01); *B32B 2250/40* (2013.01); *B32B 2255/08* (2013.01); *B32B 2255/26* (2013.01); *B32B 2307/206* (2013.01); *B32B 2307/408* (2013.01); *B32B 2307/538* (2013.01); *B32B 2433/02* (2013.01)

(58) Field of Classification Search
CPC ............ B32B 27/32; C08K 3/36; C08L 23/06
See application file for complete search history.

(56) References Cited

U.S. PATENT DOCUMENTS 3,616,164 A * 10/1971 Tanimoto et al. ............ 442/358
5,468,461 A * 11/1995 Hosoda et al. ............... 523/435
(Continued)

FOREIGN PATENT DOCUMENTS

| DE | 3827957 A1 | 3/1990 |
| EP | 0 491 101 A1 | 6/1992 |

(Continued)

OTHER PUBLICATIONS

International Search Report by European Patent Office re PCT application PCT/EP2008/010461, filed Dec. 10, 2008, by ABB AG.
(Continued)

*Primary Examiner* — Cheng Huang
(74) *Attorney, Agent, or Firm* — Robert A. Jefferis; Driggs, Hogg, Daugherty & Del Zoppo Co., LPA

(57) ABSTRACT

The invention relates to an insulation material having paint and a material additive, characterized in that the material additive comprises silicic acid and PE wax. The invention further relates to an insulating tape comprising an insulation core having a layer of insulating material according to the invention on at least one of the two flat sides.

7 Claims, 1 Drawing Sheet

(51) Int. Cl.
*B32B 21/08* (2006.01)
*B32B 27/36* (2006.01)

(56) References Cited

U.S. PATENT DOCUMENTS 6,796,599 B2 * 9/2004 Schlecht et al. .............. 296/143
2006/0089274 A1 4/2006 Sarkis et al.

FOREIGN PATENT DOCUMENTS

EP   1 067 065 A2   1/2001
EP   1 977 982 A1   10/2008
KR   930008158 B1   8/1993

OTHER PUBLICATIONS

Statement re Examination Report issued by German Patent Office re German application Serial No. 10 2007 061 587.8, filed Dec. 18, 2007.

* cited by examiner

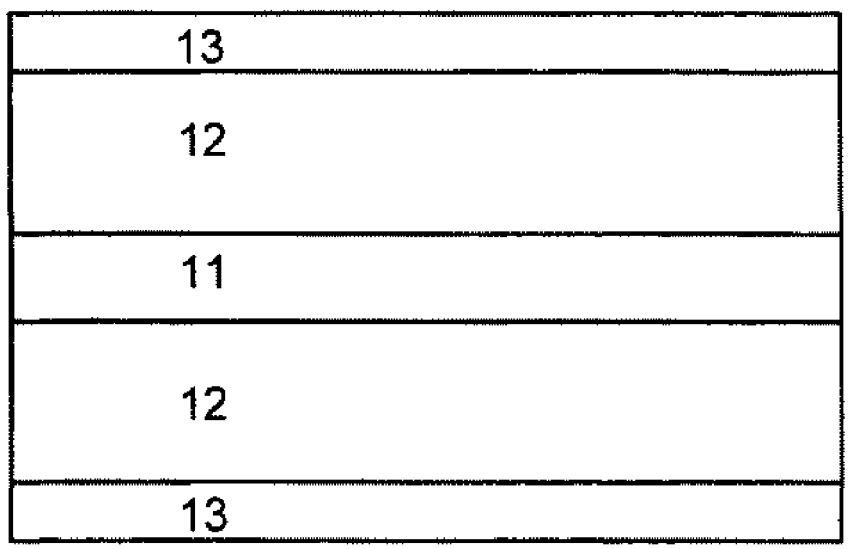

INSULATION MATERIAL HAVING PAINT AND A MATERIAL ADDITIVE, AND INSULATING TAPE

RELATED APPLICATIONS

This application is a national filing of PCT application Serial No. PCT/EP2008/010461, filed Dec. 10, 2008, which claims priority of German application Serial No. 10 2007 061 587.8, filed Dec. 18, 2007.

The invention relates to an insulation material with lacquer and added material and to an insulative belt with a layer of insulation material of the invention on at least one of the two sides.

It is well known that high-frequency welding processes are used in the production of plastic bags, in particular in medical technology. In these processes, a plurality of foil sections mutually superposed are bonded to give a bag by means of a weld that runs at least to some extent around the exterior boundary of the foil sections. In the normal method, the foils to be bonded are supplied on rolls and are in the form of mutually superposed continuous strips of material on a conveyor belt when they are introduced into a high-frequency-welding apparatus. In a production step downstream of the welding procedure, the welded strips of foil sections are separated in accordance with the geometric dimensions of the welds that surround the bags.

The basis of the high-frequency-welding process is that electrical energy is introduced in the form of a radio-frequency field into areas that require bonding. This causes motion of the molecules within the material. The resultant friction between the molecules generates the heat required for melting of the material. The weld produced by this process has the same strength as the surrounding material.

The functional principle of the high-frequency-welding process increases the level of the requirements placed upon the conveyor belt, which also serves as substrate for the high-frequency-welding procedure.

Firstly, the surface of the conveyor belt must have a particular surface roughness, in order to accept the melt produced during the welding of the foils located on the conveyor belt. Examples of suitable roughness values are from roughness index Rz 2.5 to Rz 10. This is a requirement for achieving high weld quality. There are also requirements placed upon the electrical insulation capability of the conveyor belt.

The conveyor belt used in the prior art for purposes of this type is an insulative belt which comprises a polyester foil coated on both side by a pressed woodchip product or by any other suitable cellulosic pulp. The external sides of each of the two layers of pressed woodchip material moreover have a fixing layer of gloss lacquer, in particular 2-component gloss lacquer, and when this layer is dried it does not initially have the surface roughness required.

In order to achieve the surface roughness required for the layer of gloss lacquer on a conveyor belt, the layer is abraded manually before the belt is first used for production purposes.

A disadvantage of said procedure is the time required for the grinding process, and also that this type of manual process gives rise to high tolerances in respect of the surface of the abraded conveyor belt.

Starting from this prior art, it is an object of the invention to provide a method which avoids any abrasion procedure but improves the surface roughness of an insulative belt. Another object of the invention is to provide a corresponding insulative belt which can be used as conveyor belt.

The invention achieves the object via an insulation material with lacquer and added material with the features of claim 1.

Accordingly, the added material mentioned in the introduction is characterized in that it comprises silica and polyethylene wax, hereinafter termed PE wax.

The silica particularly advantageously increases the microroughness of the surface of the lacquer, and the PE wax reduces adhesion, in particular of the welds, to the surface of the lacquer.

In one preferred embodiment of the invention, the lacquer used comprises 2-component gloss lacquer, where the proportion by weight of silica is from 9% to 14%, and the proportion by weight of PE wax is from 0.5% to 4%, of the insulation material in the wet state. The respective proportions change correspondingly in the hardened state, i.e. after escape of the volatile constituents of the insulation material.

It has been found that this compositional ratio exhibits particularly advantageous properties for the layer of lacquer, in relation to the use as substrate for the high-frequency welding of foils.

The object is also achieved via an insulative belt with insulative core and with a layer of insulation material on at least one of the two sides, with the features of claim 3 or 4.

Accordingly, the insulation material used comprises an insulation material with 2-component gloss lacquer and with the added materials silica and PE wax.

Even without any abrasion procedure, this is a particularly advantageous method of achieving a defined surface roughness of the insulative belt which can be used as conveyor belt. Liquefied plastics material which by way of example is produced during a procedure of welding of a plurality of plastics foils located on the insulation material can thus penetrate into recesses or cavities resulting from surface roughness on the surface of the conveyor belt. When the respective plastics bag is separated from the conveyor belt, the dried melt material remains in the form of a roughened surface on the bag weld, and the recesses or cavities resulting from the surface roughness of the conveyor belt are therefore again available. If the insulative belt has been coated with insulation material only on one side, care has to be taken that when the belt is used as conveyor belt it is the side that has been coated with insulation material that serves as substrate for the high-frequency-welding process. Preferred embodiment is coating of the insulative belt with insulation material on both sides.

In another embodiment of the invention, the insulative core comprises a polyester foil surrounded on both sides by a layer of cellulosic pulp.

This method achieves not only high mechanical strength but also high electrical insulation capability.

The inventive examples depicted in the drawings will be used for a more detailed description of the invention, of further embodiments and of further advantages.

FIG. 1 shows an example of a multilayer structure of an insulative belt.

The single FIGURE shows an example of a multilayer structure of an insulative belt which is suitable for use as conveyor belt. A layer of pressed woodchip material has been applied on each of two sides around an inner layer of polyester foil. Again, a cellulosic pulp with comparable properties can be used. As a function of the requirements placed upon mechanical strength and electrical insulative stability, the thickness of the polyester foil is from about 23 µm to 100 µm. The thickness of the pressed woodchip material varies accordingly as a function of requirements from about 100 µm to 300 µm. The thickness of the layer of gloss lacquer applied externally on both sides is from about 8 μm to 20 μm, in the dried state. Use of an insulation material with gloss lacquer and with added materials firstly comprising a proportion by weight of about 11.6% of silica achieves defined surface roughness of the layer of insulation material without any requirement to abrade said layer after drying. An additional proportion by weight of 1.4% of PE wax inhibits adhesion of other materials to the surface of the layer of insulation material. This in particular also applies to any adhesion of welds to the surface of the insulative belt.

Another advantage is that the surface of the insulative belt of the invention has a matt appearance. The proportion of the energy introduced into the welding process that is reflected by a glossy surface is markedly reduced, and the welding process becomes still more effective. By way of example, the use of gloss lacquer without added material produces this type of disadvantageously glossy surface.

An example of a suitable two-component gloss lacquer is the polyurethane-based product GL 3335/hardener GU106 from DuPont, which comprises solvent. An example of a suitable material for the added silica material is "Sylsia 350" or else "Syloid 244". An example of a suitable PE wax is "DM" micronized PE wax or else "Luwax AF 30".

KEY

10 Insulative belt
11 Polyester foil
12 Layer of pressed woodchip material
13 Layer of insulation material

What is claimed is:

1. A conveyor belt, comprising:
   an insulative core comprising a polyester foil that is surrounded on two sides by a layer of cellulosic pulp; and
   a layer of insulation material on at least one of the two sides, the layer of insulation material consisting of a gloss lacquer, silica and polyethylene wax, wherein a proportion by weight of the silica in layer of the insulation material is from 9% to 14%, and a proportion by weight of the polyethylene wax in the layer of insulation material is from 0.5% to 4%.

2. The conveyor belt as claimed in claim 1, wherein the gloss lacquer is a 2-component gloss lacquer.

3. The conveyor belt as claimed in claim 2, wherein the polyester foil has a thickness from 23 microns to 100 microns.

4. The conveyor belt as claimed in claim 3, wherein the layer of cellulosic pulp has a thickness from 100 microns to 300 microns, and the layer of insulation material has a thickness from 8 microns to 20 microns in a dried state.

5. The conveyor belt as claimed in claim 4, wherein the proportion by weight of the silica in the layer of insulation material is 11.6 percent.

6. The conveyor belt as claimed in claim 5, wherein the layer of insulation material has a matt appearance that is not glossy.

7. The conveyor belt as claimed in claim 6, wherein the matt appearance surface has a roughness index Rz in a range between 2.5 and 10.

* * * * *